June 22, 1926. 1,589,387

C. HARTFORD

PACKAGE OF WELDING WIRES AND METHOD OF MAKING THE SAME

Filed June 14, 1922

INVENTOR
CLAUDE HARTFORD
BY
ATTORNEYS

Patented June 22, 1926.  1,589,387

UNITED STATES PATENT OFFICE.

CLAUDE HARTFORD, OF MAPLEWOOD, NEW JERSEY, ASSIGNOR TO WILSON WELDER & METALS COMPANY, INCORPORATED, OF NEW YORK, N. Y., A CORPORATION OF NEW YORK.

PACKAGE OF WELDING WIRES AND METHOD OF MAKING THE SAME.

Application filed June 14, 1922. Serial No. 568,279.

Welding wires are used, in connection with the arc welding of metals, to furnish the metal which joins the two parts to be welded, or which fills in or builds up at the point where the weld is to be located. Wires of different composition are used for different welding operations; and for the production of satisfactory welds, it is essential that a welding wire of proper composition be chosen. Furthermore, welding wires are ordinarily coated with a substance which acts as a flux, and it is important that this coating be preserved until the wires are used.

Prior to the present invention, welding wires, in lengths of about 14″, were sold gathered together in bundles and held by a wrapping wire. This method of packaging the wires, however, was objectionable, since it allowed the wires to rub against one another and thereby rub off their flux coating. This method of packaging was also objectionable because, after a few wires had been removed from a bundle, the remaining wires were loose and easily misplaced and mixed with other wires of different composition; and also because after a wire had been removed from the bundle, there was nothing to differentiate it from other wires of different composition. As will be readily understood, with welding wires so packaged, it was a very difficult matter for a workman using an arc welding outfit to keep his welding wires of different compositions separate from one another and always quickly available.

According to the present invention, a package is provided which will so hold welding wires that the flux coating on them will not be rubbed off, and also so that, while wires can readily be withdrawn from the package, the remaining wires will nevertheless be frictionally retained in their proper places in the package. Moreover, after a wire has been wthdrawn from the package, the whole or an unused part of it may readily be reinserted, means being provided for identifying a wire with the particular package from which it was drawn.

Figure 1:
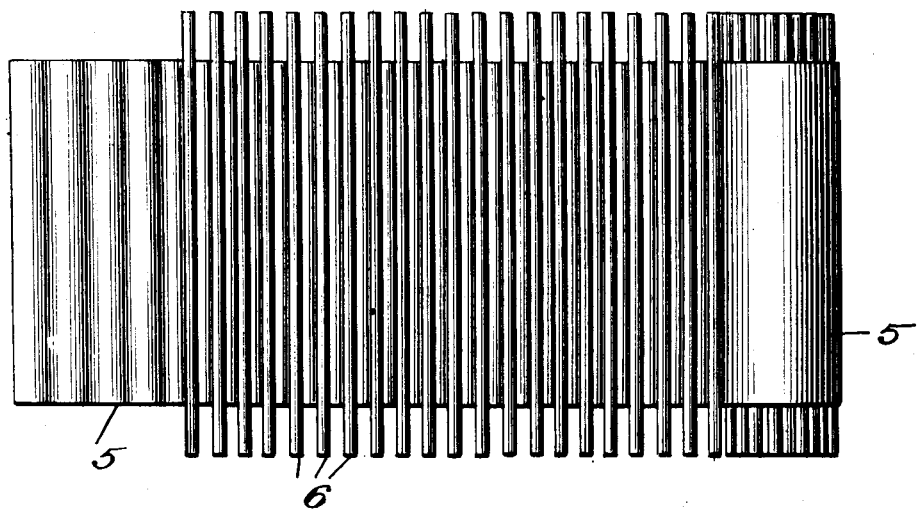
Figure 3:
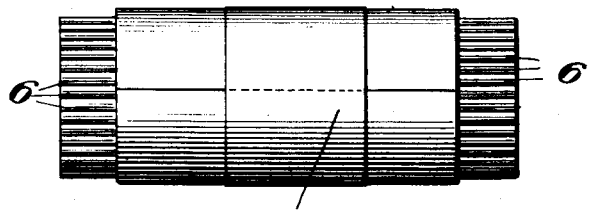
Figure 4:
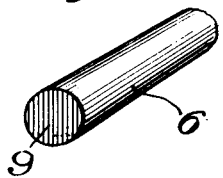
Figure 2:
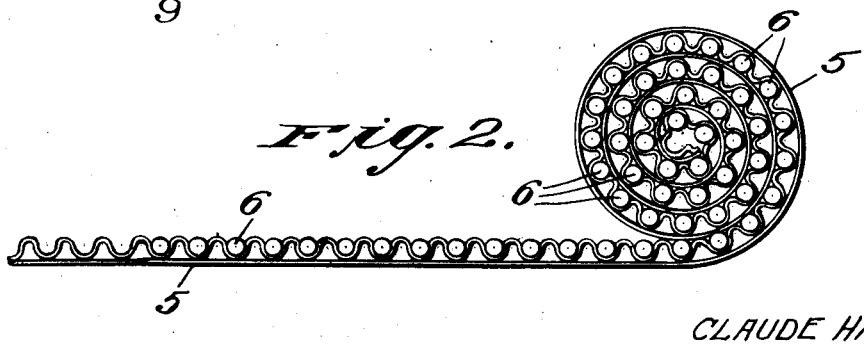

The invention will be understood from the following description taken in connection with the accompanying drawing in which Figure 1 is a plan view of the package of welding wires partly rolled up during the process of making it; Figure 2 is an end elevation corresponding to Figure 1; Figure 3 is a side elevation of the completed package; and Figure 4 is a perspective view of a portion of one of the welding wires, showing the colored end thereof.

Referring to the drawing, the material of which the package is formed is shown as comprising a sheet of corrugated flexible material 5. This material is preferably the well-known form of card-board which is substantially smooth on one side and corrugated on the other. Such card-board is flexible and can be wound into and held in volute form. The card-board, in the direction of the corrugations, should be materially less than the length of the wires 6 to be packaged; and the length of the card-board should be such that the number of its corrugations will somewhat exceed the number of welding wires which it is desired to assemble in one package.

The structure of the package can best be described by explaining the manner in which it is most conveniently assembled. A piece of the corrugated card-board 5 above mentioned is laid out on a flat surface with its smooth side down. The wires 6 to be packaged are then laid upon the corrugated side of the card-board, and by manual manipulation are rolled into the corrugations, a few empty corrugations being left at each end of the sheet. The wires are then adjusted longitudinally so that their ends lie in two parallel planes spaced about equal distances from the edges of the sheet. The sheet 5, with the wires 6 in its corrugations, is then rolled up upon itself from one end into volute form, and is permanently secured in that form by any suitable means such as a strip 7 of paper or other suitable material, which is wound around and preferably pasted to the outside of the card-board volute. A single bundle ordinarily contains wires all of the same composition, and in order to provide means for identifying these wires after they are withdrawn from a package, both ends of the wires are preferably painted with a certain color used for all wires of that composition, as shown at 9 in Figure 4. In order to further assist in identifying the composition of the wires in a particular package, the strip 7 is preferably made of paper corresponding to the color on the ends of the wires in that bundle, or printing on said strip is in ink of that color, or the name of the color is printed on the strip.

With the form of package above described, the wires are frictionally held within the spaces bounded by the corrugated side and the smooth side of adjacent layers of the corrugated sheet, but may readily be withdrawn therefrom. The withdrawal of the wires does not, however, seriously affect the stability of the package; and there is no difficulty in re-inserting in the package an unused or partially used wire.

Owing to the fact that both ends of the wires are colored, a workman soon becomes accustomed to using up a wire entirely from one end and thus preserving the coloring on the other end in order to identify the composition of the wire; and as long as this identifying color is available, a workman is not likely to make a mistake either in drawing on his supply of welding wires or in returning to his supply a partially used wire. In other words, the colored ends of the wires, in connection with the corresponding color or notation on the strip 7, give to the workman a visual indication of composition which he is not likely to disregard. This form of package, therefore, materially contributes to the production of proper welds by the arc welding method.

While the present invention is particularly useful in connection with the packaging of welding wires, it is, of course, to be understood that it is not limited to this field of usefulness, but that it may be employed to advantage in the packaging of other articles.

What I claim is:

1. A package of welding wires comprising a sheet of flexible material which is substantially smooth on one side and corrugated on the other and is wound up into and permanently secured in volute form, the wires being located between and frictionally engaged and held against longitudinal displacement in the package by the corrugated side and the smooth side of adjacent layers of the volute of said flexible material, but so that each wire is capable of individual removal and replacement.

2. A package of welding wires comprising a sheet of flexible material which is substantially smooth on one side and corrugated on the other and is wound up into and permanently secured in volute form, the wires being located between and frictionally engaged and held by the corrugated side and the smooth side of adjacent layers of the volute of said flexible material, the ends of said wires being colored to indicate their composition, and the outside of the flexible material bearing a color corresponding to the color on the ends of the wires.

3. A package of welding wires comprising a sheet of corrugated flexible material which is wound up into and permanently secured in volute form, the wires being located between and frictionally engaged and held against longitudinal displacement in the package by the adjacent layers of the volute of said flexible material, the ends of said wires being colored to indicate their composition, and the outside of the flexible material bearing a color corresponding to the color on the ends of the wires.

4. A package of welding wires comprising superimposed layers of corrugated sheet material, and means for holding said layers of corrugated sheet material in contiguous relation, the welding wires being located between and frictionally engaged and held against longitudinal displacement in the package by adjacent layers of said corrugated sheet material, the ends of said wires being colored to indicate their composition, and the outside of said package bearing a color corresponding to the color on the ends of the wires.

In testimony whereof I have affixed my signature to this specification.

CLAUDE HARTFORD.